(12) United States Patent
Cerveny (10) Patent No.: US 10,150,597 B2
(45) Date of Patent: Dec. 11, 2018

(54) CAP FOR A CONTAINER AND A PACKAGE COMPRISING SUCH A CAP

(71) Applicant: NESTEC S.A., Vevey (CH)

(72) Inventor: Jean-Paul Cerveny, Vittel (FR)

(73) Assignee: Nestec S.A., Vevey (CH)

( * ) Notice: Subject to any disclaimer, the term of this patent is extended or adjusted under 35 U.S.C. 154(b) by 0 days.

(21) Appl. No.: 15/531,865

(22) PCT Filed: Dec. 9, 2015

(86) PCT No.: PCT/EP2015/079062
§ 371 (c)(1),
(2) Date: May 31, 2017

(87) PCT Pub. No.: WO2016/096557
PCT Pub. Date: Jun. 23, 2016

(65) Prior Publication Data
US 2017/0259966 A1    Sep. 14, 2017

(30) Foreign Application Priority Data

Dec. 15, 2014 (EP) ..................................... 14198036

(51) Int. Cl.
*B65D 41/32* (2006.01)
*B65D 45/20* (2006.01)
(Continued)

(52) U.S. Cl.
CPC .............. *B65D 45/20* (2013.01); *B29B 11/14* (2013.01); *B29C 49/0073* (2013.01);
(Continued)

(58) Field of Classification Search
CPC .... B65D 45/20; B65D 1/0246; B65D 41/185; B29B 11/14; B29B 2911/14553; B29C 49/0073; B29L 2031/712
(Continued)

(56) References Cited

U.S. PATENT DOCUMENTS 2,486,364 A * 10/1949 Simmons ............. B65D 41/185
215/11.1
2,546,566 A * 3/1951 Schweizer ............. B65D 41/18
215/250
(Continued)

FOREIGN PATENT DOCUMENTS

AU          46514/89          3/1994
CN          1101322 A         4/1995
(Continued)

OTHER PUBLICATIONS

Chinese Office Action for Application No. 201580068090.0, dated Sep. 4, 2018.

*Primary Examiner* — J. Gregory Pickett
*Assistant Examiner* — Niki M Eloshway
(74) *Attorney, Agent, or Firm* — K&L Gates LLP (57) ABSTRACT

A cap (100) for a container comprises a disc-shaped top section (102), an annular side section (104) projecting from said disc-shaped top section (102), and a locking flange (111) disposed at an extremity of said annular side section (104) opposite said disc-shaped top section (102), and further comprises a locking flap (116) extending from said annular side section (104), which is mobile between a locked first position wherein a portion (114) of the locking flange (111) extends inwardly from the annular side section (104), and an unlocked second position wherein the locking flange (111) is at least partially recessed relative to the annular side section (104).

8 Claims, 4 Drawing Sheets (51) Int. Cl.

| | | |
|---|---|---|
| *B65D 41/18* | (2006.01) | |
| *B65D 43/02* | (2006.01) | |
| *B29B 11/14* | (2006.01) | |
| *B29C 49/00* | (2006.01) | |
| *B65D 1/02* | (2006.01) | |
| *B65D 50/00* | (2006.01) | |
| *B29L 31/00* | (2006.01) | |

(52) U.S. Cl.
CPC ......... *B65D 1/0246* (2013.01); *B65D 41/185* (2013.01); *B65D 43/0256* (2013.01); *B29B 2911/14553* (2013.01); *B29L 2031/712* (2013.01)

(58) Field of Classification Search
USPC .......................................... 215/43, 250, 317
See application file for complete search history.

(56) References Cited

U.S. PATENT DOCUMENTS

| | | | | |
|---|---|---|---|---|
| 3,825,144 A | | 7/1974 | Wiedmer | |
| 4,376,493 A | * | 3/1983 | Gall | B65D 43/0218 220/784 |
| 4,564,116 A | * | 1/1986 | Prohaska | B65D 41/44 215/250 |
| 4,632,271 A | * | 12/1986 | Taylor | B65D 41/18 220/258.2 |
| 4,768,668 A | * | 9/1988 | Van Den Brink | B29C 45/4407 215/305 |
| 4,966,302 A | * | 10/1990 | Hjordie | B65D 43/0218 220/268 |
| 5,103,990 A | * | 4/1992 | Irwin | B65D 41/525 215/212 |
| 5,425,467 A | | 6/1995 | Feer et al. | |
| 7,611,027 B2 | * | 11/2009 | Kim | B65D 41/48 215/250 |
| 2003/0116525 A1 | * | 6/2003 | Futral | B65D 1/0276 215/373 |
| 2008/0230507 A1 | * | 9/2008 | Peacop | B65D 43/0212 215/329 |

FOREIGN PATENT DOCUMENTS

| | | | |
|---|---|---|---|
| CN | 1622900 A | 6/2005 | |
| CN | 1946612 A | 4/2007 | |
| CN | 102770350 A | 11/2012 | |
| DE | 1911979 | 10/1970 | |
| FR | 1505614 | 12/1967 | |
| FR | 2377333 | 8/1978 | |
| GB | 1169978 A | 11/1969 | |
| WO | WO 9321080 A1 * | 10/1993 | ........... B65D 41/485 |

\* cited by examiner

CAP FOR A CONTAINER AND A PACKAGE COMPRISING SUCH A CAP

CROSS REFERENCE TO RELATED APPLICATIONS

The present application is a National Stage of International Application No. PCT/EP2015/079062, filed on Dec. 9, 2015, which claims priority to European Patent Application No. 14198036.7, filed on Dec. 15, 2014, the entire contents of which are being incorporated herein by reference.

FIELD OF THE INVENTION

The present invention concerns a cap for a container, as well as a package comprising such a container.

BACKGROUND OF THE INVENTION

In the packaging arts, it is generally known to provide resealable closures on containers whose contents are not necessarily consumed all at once. They are used for packaging a wide variety of products, and are notably favoured for beverages and other comestibles.

A number of different kinds of resealable closures are known, for instance swinging lever closures, caps, and sliding push-pull closures. Among such closures, caps are regarded as particularly advantageous in that the consumer may open, re-seal, and re-open the container without the need of tools. Of these, the two types which command the overwhelming majority of market share are the press-on snap cap and the screw-on cap.

Snap-caps are generally flat and fabricated from a flexible plastic, and typically comprise an annular groove disposed on a lower surface of the cap; this annular groove clasps a bead disposed about a mouth of the container; when attaching the cap the bead is pressed into the groove, causing the groove to open enough to permit the bead to seat therein. At this point, the elasticity of the cap causes the groove to close around the seated bead, retaining the cap on the container. To open the container, the cap is merely grasped at one edge and bent upwards; the groove deforms to permit the bead to be extracted from the cap as it is removed from the container.

Such snap-caps are inexpensive to fabricate and require relatively little force to open and close. However, this also means that the strength of the joint between cap and container is weak. As a result, the cap may be easily dislodged when the cap or container are subjected to external shocks and impacts (particularly from the lateral direction) that may be encountered during transport and use of the container, leading to leakage and spills.

Screw-on caps, in contrast, are generally fabricated from a hard plastic or metal, and comprise internal threads which engage complementary threads disposed about the neck of the container. When screwed tightly to the container they provide a tight, leakage-resistant seal, and cannot be dislodged during normal use by external shocks and impacts as snap-caps can.

However, screw-on caps are less than ideal, in that they require a large amount of force to open and close. This poses difficulties to children, the elderly, and others who do not have sufficient strength or manual dexterity to properly tighten and loosen such a closure. Moreover, the provision of threads in the cap and on the neck of the container requires an increased level of precision in the manufacture of both relative to other types of closures, increasing the cost of the container.

There is thus a need for a cap for a container which may be easily opened and closed, which is resilient to shock and impact, and which is inexpensive to fabricate and implement. It is therefore an object of the invention to provide a closure which presents at least some of these attributes.

SUMMARY OF THE INVENTION

According, therefore, to a first aspect, there is provided a cap for a container, comprising a disc-shaped top section, an annular side section projecting substantially perpendicularly from the perimeter of said disc-shaped top section, and a locking flange disposed at an extremity of said annular side section opposite said disc-shaped top section.

According to the invention, the cap further comprises a locking flap extending from at least a portion of said extremity of said annular side section, said locking flap being mobile between a locked first position wherein a portion of said locking flange contiguous with said locking flap extends inwardly from an interior face of said annular side section, and an unlocked second position wherein said locking flange is at least partially recessed relative to said interior face of said annular side section.

This is advantageous in that the cap may be securely attached to a container simply by putting the locking flap in the first position. Since disposing the locking flap places the locking flange in a position where it projects inwardly from the annular side section of the cap, when the cap is disposed on a container it will engage and lock to an undercut near the mouth of the container, in the form of a suitably-dimensioned a rim or channel in the neck of the container. In this way, a seal is created between the cap and the container.

Conversely, when the locking flap is moved into the second unlocked position, the locking flange is disposed exterior to the imaginary surface formed by the extension of the interior face of the annular side. In other words, when the locking flap is disposed in the unlocked second position, the locking flange is displaced into a position where it will not engage the container and prevent the cap from being removed therefrom.

This is also advantageous in that since the locking flap extends from the extremity of the annular side section of the cap where the locking flange is also disposed, the locking flap forms a lever whose deflection moves the locking flange between the locked first position and the unlocked second position. The locking flap will thus multiply the force applied to it by the user, permitting a greater sealing and retaining force to be realized between the cap and the container than would be possible by a simple snap-on operation. The cap is thereby rendered resistant to being inadvertently removed.

Conversely, for a given sealing force the amount of force that must be applied by the user to open and close the container is greatly reduced, facilitating the use of the container by those who would otherwise have difficulty manipulating the closure means known in the art.

In a preferred embodiment, the locking flap is bistably mobile between the locked first and unlocked second positions.

This is advantageous in that the locking flap is biased to move to and hold itself in either of the two positions. As a result, the locking flap is rendered more resistant to inadvertent deflection, while retaining a high ease of operation.

Preferably, the locking flap is bistably mobile about a centre position defined by a plane parallel with the disc-shaped top section and intersecting the extremity of the annular side section, such that it forms an oblique angle with the annular side section when said locking flap is disposed in the locked first position, and forms an acute angle with the annular side section when said locking flap is disposed in the unlocked second position.

This is advantageous in that the position of the flap relative to the rest of the cap gives an intuitive visual indicator of whether the cap is locked to the container. Specifically, when the flap is pointing "down," i.e. towards the container, the cap is locked to it; when the flap is pointing "up," i.e. away from the container, it is unlocked and may be removed from the container.

Furthermore, configuring the bistable motion of the flap in such a way is advantageous in that it naturally facilitates the manipulation of the locking flap between the locked first and the unlocked second positions. For instance, when moving the locking flap from the locked first into the unlocked second position when the container is normally oriented (i.e. with the neck pointing upwards), the user will pull on the locking flap in such a way as to also pull on the cap, thereby facilitating its separation from the container. Conversely, when moving the locking flap into the locked first from the unlocked second position, the user will press on the locking flap in such a way that the cap is pressed into the container, facilitating the motion of the locking flap and ameliorating the sealing that results. The use of the cap is thereby made more intuitive.

In one possible embodiment, the locking flap extends from the extremity of the annular side section along the entire perimeter of said extremity.

Such a cap will realize the greatest possible sealing force, in that the cap engages the container upon which it is used over its entire circumference.

In another possible embodiment, the locking flap extends from the extremity of the annular side section along a portion of the perimeter thereof, the locking flange being thereby divided into an immobile first portion and a mobile second portion contiguous with said locking flap.

This is advantageous in that, by restricting the locking flap to a portion of the annular side section, the force that is needed to displace the locking flap between the first and second positions is reduced. When working in combination with the immobile first portion of the locking flange, the mobile second portion will realize a closure force sufficient for many applications, while minimizing the force necessary to open and close the container.

Optionally, the immobile first portion of the locking flange extends from a segment of the annular side section comprising between 20° and 80°, inclusive, of the annular side section.

Optionally, the mobile second portion of the locking flange extends from a segment of the annular side section comprising between 20° and 80°, inclusive, of the circumference of said annular side section.

This is advantageous in that the reduced length of the immobile first and mobile second portions of the locking flange will reduce the cost of fabricating the cap and the effort required to attach and remove it, while maintaining a sealing force sufficient for many applications.

Preferably, the immobile first portion and the mobile second portion of the locking flange are disposed substantially symmetrically about the annular side section.

Most preferably, the immobile first portion is disposed directly opposite the mobile second portion.

This is advantageous in that the sealing force that is applied to the container by the locking flanges will be symmetrical about the axis of the container. The cap will therefore avoid any deformation of the container when the locking flap is placed in the locked second position, reducing in turn the possibility of leaks past the cap. The reliability of the cap is thereby improved.

Advantageously, the locking flap is a segment of a hollow conic frustum.

A locking flap in such a configuration is particularly desirable in that, for a cap with an overall cylindrical aspect, it minimizes the amount of material required to fabricate the cap, rendering it lighter and less expensive to produce. A conic section has the further advantage of being readily adaptable to the contours of curved containers, naturally sitting pressed against the exterior of the container when the locking flap is disposed in the locked first position. This obviates the need for plastic overwraps or other such additional packaging means to retain the locking flap in place.

In another possible embodiment, the cap further comprises a frangible tab attached perpendicularly to the annular side section and the locking flap, said locking flap being thereby immobilized in the locked first position.

This is advantageous in that the frangible tab serves as a tamper-evident device. As it is necessary to break the frangible tab from the cap to displace the locking flap from the locked first position into the unlocked second position, damage to or absence of the frangible tab will indicate to the consumer that the container has been tampered with.

Furthermore, since the frangible tab immobilizes the locking flap, the frangible tab will serve to prevent the locking flap from moving and the cap from being dislodged when the locking flap is inadvertently subjected to impact or abrasion prior to use, such as during transport or storage.

Moreover, as the frangible tab is an integral part of the cap, there is no need to provide any separate tamper-evident devices with the container, nor implement any particular machine or apparatus in the production line for its implementation.

Optionally, the cap further comprises a sealing ring projecting from the disc-shaped top section and disposed coaxially within the annular side section.

This is advantageous in that the sealing ring will come in contact with an interior surface of the container. As the neck of the container enters into an interference fit with the sealing ring and the annular side section, the sealing effectiveness of the cap is further improved.

Preferably, the sealing ring projects from the disc-shaped top section following an oval or elliptical curve.

This is advantageous in that the non-circular form of the sealing ring will serve to center the cap upon the mouth of the container when the former is placed upon the latter with an angled or off-centered orientation. The useability and reliability of the cap is thereby further improved.

According to a second aspect, there is provided a preform for the fabrication of a container, comprising a neck opening into a mouth at one extremity.

According to the invention, the preform further comprises a shoulder disposed about said neck proximate to said mouth, said shoulder being configured to be engaged by a locking flange of a cap according to the preceding description.

This is advantageous in that a preform so configured, and a container fabricated from such a preform, will be ideally suited to accommodate a cap as described above and realize a tight, secure seal therewith.

According to a third aspect, the invention is directed to a package comprising a container fabricated from a preform as described above, and a cap as described above, said cap being disposed upon the mouth of said container such that the locking flange of said cap engages the shoulder of the neck of said container.

Such a package is advantage in that it realizes the advantages of the cap described above in the form of a package that may be used for the distribution of products to end consumers.

BRIEF DESCRIPTION OF THE DRAWINGS

Additional features and advantages of the present invention are described in, and will be apparent from, the description of the present embodiments which are set out below with reference to the drawings in which.

DETAILED DESCRIPTION OF THE INVENTION

For a complete understanding of the present invention and the advantages thereof, reference is made to the following detailed description of the invention.

It should be appreciated that various embodiments of the present invention can be combined with other embodiments of the invention and are merely illustrative of specific ways to make and use the invention and do not limit the scope of the invention when taken into consideration with the claims and the following detailed description.

As used in this specification, the words "comprises," "comprising," and similar words, are not to be interpreted in an inclusive or exhaustive sense. In other words, they are intended to mean "including, but not limited to."

Furthermore, in the following description, it should be understood that terms used to express geometric or other such relations (e.g. "parallel") between components are considered as being substantive terms rather than exact ones, and that as a result the qualifier "substantially" is to be read into any such term unless stated otherwise.

The invention is further described with reference to the following examples. It will be appreciated that the invention as claimed is not intended to be limited in any way by these examples.

Figure 1A:
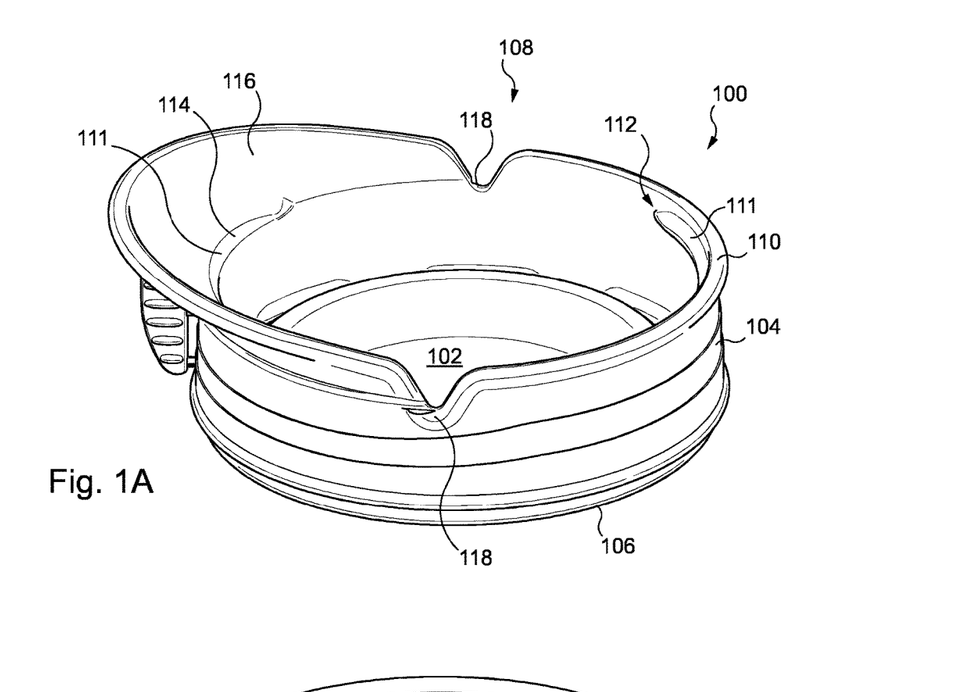
FIGS. 1A & 1B are bottom and top perspective views, respectively, of a cap according to a first embodiment of the invention.
Figure 1B:
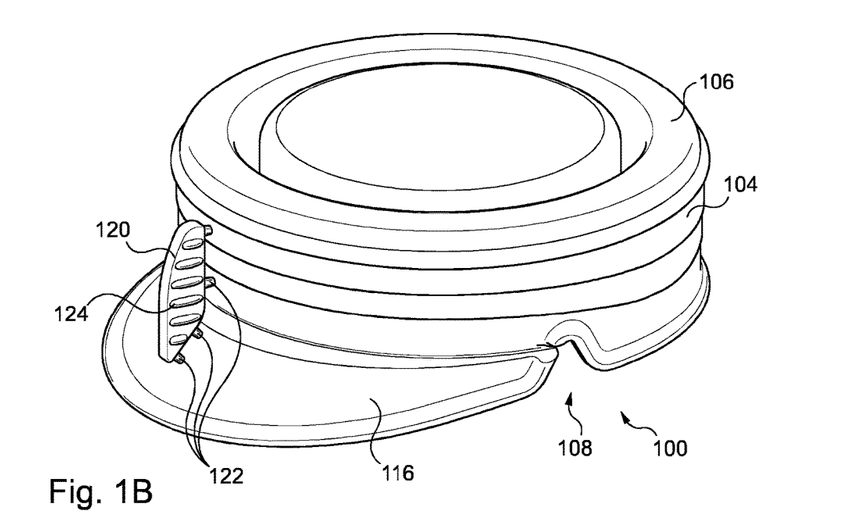

FIGS. 1A & 1B are bottom and top perspective views, respectively, of a cap according to a first embodiment of the invention. Of course, it will be understood that the cap depicted in FIGS. 1A & 1B is intended to be attached to a container, and as such for the purposes of this document orientative terms such as "top" and "bottom" shall be assumed to be as for a cap which is attached to an upright container.

In FIG. 1A, the cap 100 comprises globally a disc-shaped top section 102 and an annular side section 104. The annular side section 104 extends from the perimeter 106 of the disc-shaped top section 102 in a substantially perpendicular direction, with the result that the cap 100 is of a generally cylindrical form, with one open end 108 opposite the disc-shaped top section 102 which accommodates a neck of a container (not shown) to which the cap 100 is attached. The open end 108 is delimited by the rim 110 of the cap 100, said rim 110 constituting an extremity of the annular side section 104 opposite the disc-shaped top section 102.

The cap 100 is further provided with a locking flange 111, which is in this embodiment separated into the immobile portion 112 of the locking flange and a mobile portion 114 of the locking flange. The portions 112, 114 of the locking flange 111 engage a ridge or channel provided in a neck of a container to which they are attached, thereby retaining the cap thereupon and sealing the container.

The immobile portion 112 of the locking flange 111 is disposed upon a circumference of the annular side section 104 such that it is opposite the mobile portion 114 of the locking flange 111.

It should be noted that in certain embodiments such as this one, the several portions 112, 114 of the locking flange 111 may collectively extend over only a portion of the circumference of the annular side section 104; this may be done to economise on material and reduce the amount of force needed to attach the cap to the container. In such cases, the locking flange 111 is ideally configured such that the parts thereof are disposed along the circumference of the annular side section 104 in a symmetrical fashion, as is the case here with the immobile portion 112 and the mobile portion 114 of the locking flange 111.

Furthermore, in such embodiments it may be particularly advantageous to configure the locking flange such that each part thereof extends over a portion of the circumference of the annular side section comprising between 20° and 80° thereof; in the present embodiment, the immobile portion 112 and the mobile portion 114 of the locking flange 111 each extend over approximately 45° of the circumference of the annular side section 104.

It will be readily recognized, however, that in other embodiments the portions of the locking flange may extend over different, not necessarily identical or symmetrical, portions of the circumference of the annular side section, according to the particularities of the application in which that embodiment is to be employed.

The cap 100 is further provided with a locking flap 116, extending from a portion of the rim 110 of the cap 100. The locking flap 116 is substantially coincident with the mobile portion 114 of the locking flange in this embodiment, and mobile between a locked first position as depicted here, and an unlocked second position wherein the locking flap 116 is rotated towards the disc-shaped top section 102 about the portion of the rim 110 contiguous with said locking flap 116, thereby forming an acute angle with the annular side section 104 of the cap 100.

Where the cap 100 is fabricated from a flexible, elastic material (e.g. HDPE plastic), this will cause the mobile portion 114 of the locking flange to rotate towards the disc-shaped top section 102 as well. The cap 100 is, in this embodiment, provided with notches 118. The notches 118 reduce stress concentrations at the intersection of the locking flap 116 and the annular side section 104, reducing the likelihood of cracking and tearing.

Caps such as the cap 100 depicted here are thus ideal for fabrication by injection moulding or other such processes which can produce relatively complex shapes quickly and inexpensively.

FIG. 1B shows the cap 100 from above. The cap 100 is provided with a tab 120, which is moulded integrally with the cap 100 and connected therewith by frangible sprues 122. The frangible sprues 122 unify the tab 120 with both the annular side section 104 and the locking flap 116, and is disposed substantially parallel with both of them. This causes the tab 120 to block the motion of the locking flap 116, holding it in the locked first position as shown here in FIG. 1B.

To open the container, the user must snap off the tab 120 by grasping it and deflecting it so as to snap the frangible sprues 122. To facilitate this, the tab 120 is here provided with ridges 124, which improve the user's grip upon the tab 120.

The tab 120 is, as here, preferably configured such that the cap 100 cannot be removed from the container to which it is attached without the tab 120 being removed first. In this way, the tab 120 serves as a tamper-evident device, in that any tampering with the container will be immediately noticeable to the consumer in the form of a damaged or missing tab 120.

Thus, the configuration of the tab 120 and the frangible sprues 122, in particular the force required to break said frangible sprues 122, may be adapted to the product contained within the container, and/or the profile of the consumer for which the product is destined.

Of course, it should be understood that in other embodiments there may be provided multiple tabs, or tabs in a different configuration than that which is depicted in FIG. 1B. It may be particularly advantageous to mould words or images into the tab, or provide the tab in some other configuration which is adapted to the particular application in which it is employed.

Figure 2A:
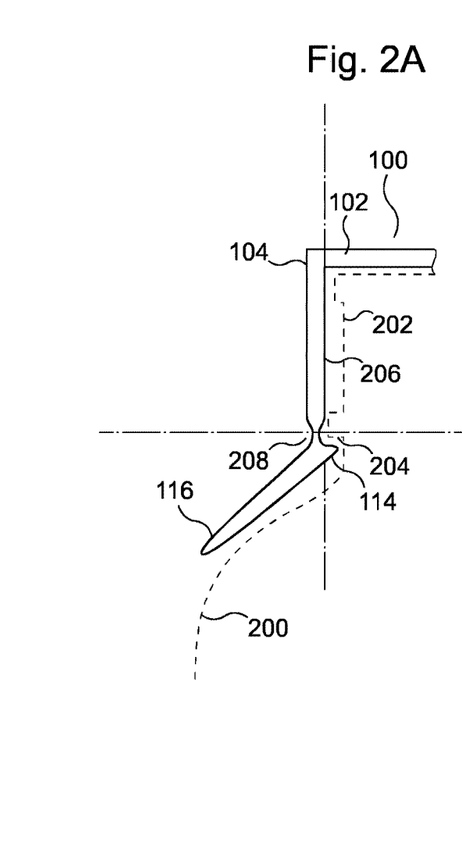
FIGS. 2A & 2B are partial cross-sectional views of the cap of FIGS. 1A & 1B, in a locked and unlocked position, respectively.
Figure 2B:
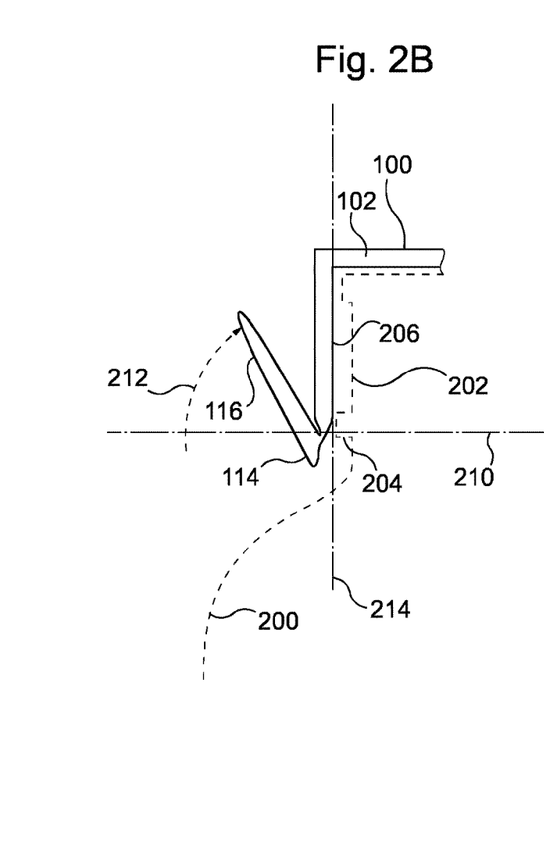

FIGS. 2A & 2B depict the cap 100 with the locking flap 116 in a locked first position and an unlocked second position, respectively. In FIG. 2A, the cap 100 is depicted as disposed upon a container 200 (depicted here in schematic form) at a neck 202 thereof. The container 200 is fabricated from a preform (not shown), which is furnished with a shoulder 204 against which the mobile portion 114 of the locking flange is brought into abutment. The shoulder 204 extends about the entire circumference of the neck 202 of the container, so that the cap 100 need not be placed in any particular orientation when being attached to the container 200.

The cap 100 is retained upon the neck 202 of the container 200 by the interaction of the locking flange 111 with the shoulder 204, in particular where the mobile portion 114 of the locking flange 111 projects beyond an interior face 206 of the annular side section 104 and prevents the cap 100 from being removed from the container 200.

It should be noted that, while the shoulder 204 is here in the form of a bead of square cross-section which encircles the neck 202 of the container 200, other configurations may be more appropriate for other embodiments of the invention. For instance, the shoulder may comprise the uppermost face of a channel which is cut or moulded into the neck of the container, or it may comprise the underside of a ring or bead which encircles the neck. The actual form of the shoulder, as with the form of the cap and its constituent components, should thus be considered to be at least partially a function of the application in which the cap and corresponding container is to be employed.

It is also evident in FIG. 2A that the locking flap 116 is fabricated integrally with the cap 100, in that the locking flap 116 is joined to the annular side section 104 at a hinge 208. The hinge 208 is, in this embodiment, merely a localized reduction in the thickness of the plastic used to fabricate the cap 100, and as such makes the locking flap 116 mobile with respect to the annular side section 104 while simplifying the fabrication of the cap 100.

Furthermore, in this embodiment the locking flap 116 is provided in the form of a segment of a hollow conic frustum. Thus, given that the hinge 208 is located at the root of the locking flap 116 where it extends from the annular side section 104 along a constant, circular-segment curve, the locking flap 116 will be bistable about a plane 210, which extends through the hinge 208 parallel with the disc-shaped top section 102 of the cap 100.

In other words, the locking flap 116 will naturally put itself into either the locked first position shown in FIGS. 1A, 1B, & 2A, or the unlocked second position shown in FIG. 2B (discussed below).

It should also be noted that, owing to the positioning of the hinge 208, the locking flap 116 will serve to act as a lever when it is operated. This multiplies the force that is brought to bear by the mobile portion 114 of the locking flange against the shoulder 204, thereby increasing the strength with which the cap 100 is attached to the container 200 and the resistance of the seal between the two.

FIG. 2B depicts the cap 100 and the container 200 when the locking flap 116 is disposed in the unlocked second position. The locking flap 116 has been rotated upwards along a path 212, resulting in the mobile portion 114 of the locking flange rotating outwards away from the shoulder 204.

In the present embodiment depicted here in FIGS. 2A & 2B, the locked first and the unlocked second position are substantially symmetric about the plane 210, which thus comprises the centre point of the bistable motion of the locking flap 116. However, other configurations of the motion of the locking flap, in particular the configuration of the locked first and unlocked second positions relative to the rest of the cap, may vary as a function of the application.

Returning to the present embodiment, as a result of the displacement of the locking flap 116 into the second unlocked position, the mobile portion 114 of the locking flange is in a position which is recessed relative to the interior surface 206 of the annular side section 104. This is illustrated here in FIG. 2B by an imaginary surface 214, which is an extension of the interior surface 206 of the annular side section 104; the mobile portion 114 of the locking flange is positioned so as not to intersect the imaginary surface 214.

With the mobile portion 114 of the locking flange so positioned, the cap 100 can now be easily withdrawn from the neck 202 of the container 200, as the mobile portion 104 of the locking flange can no longer come into contact with the shoulder 204.

Figure 3:
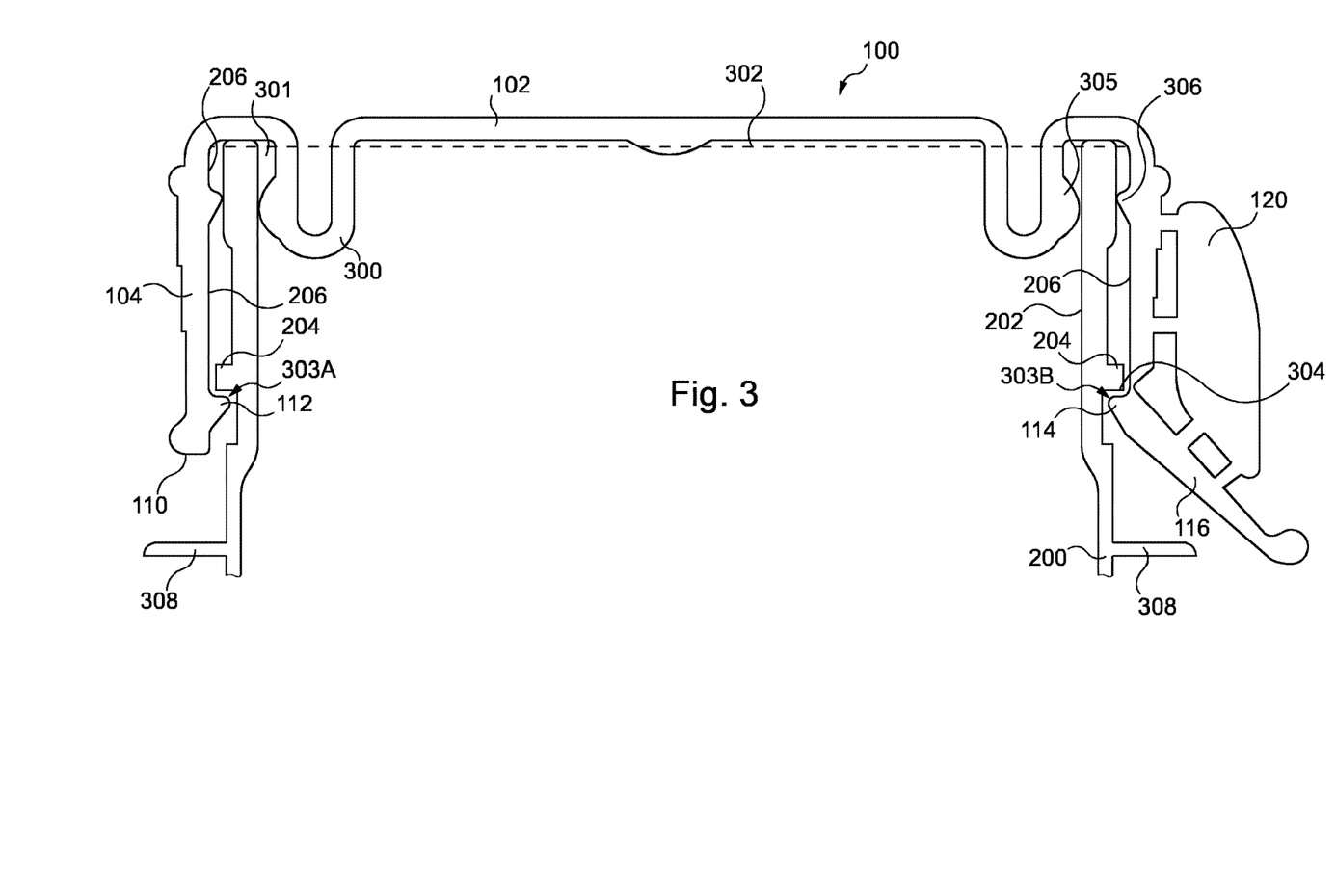
FIG. 3 is a cross-sectional view of the cap of FIGS. 1A & 1B.

FIG. 3 depicts the cap 100, which is provided with a sealing ring 300 which extends from the disc-shaped top section 102 towards the rim 110, extending coaxially within the annular side section 104. The sealing ring 300, in cooperation with the interior surface 206 of the cap 100, forms an annular notch 301 which is configured to accommodate the mouth 302 of a container 200 therein.

Thus, in the present embodiment as depicted here in FIG. 3, when the cap 100 is attached to the container 200, the neck 202 lodges in the annular notch 301, creating an interference fit therewith. This further augments the quality of the seal between the cap 100 and the container 200, and prevents the accidental dislodgement of the cap 100 when the locking flap 116 is disposed in the unlocked second position as discussed above.

In FIG. 3 it is illustrated how the cap 100 engages the container 200 to lock itself thereto. The part of the immobile portion 112 of the locking flange nearest the disc-shaped top portion 102 of the cap 100 is the locking face 303A, which is disposed substantially perpendicularly with the interior surface 206 of the cap 100. When the cap 100 is disposed upon the container 200, the locking face 303A will abut the shoulder 204, preventing the cap 100 from being withdrawn from the container 200.

Likewise, the mobile portion 114 of the locking flange comprises a locking face 303B. As the mobile portion 114 of the locking flange rotates with the locking flap 116, the angle that the locking face 303B forms with respect to the interior surface 206 of the cap 100 will vary.

Thus, when the locking flap 116 is disposed in the locked first position, as illustrated in FIG. 3, the locking surface 303B will project substantially perpendicularly from the interior surface 206, such that it will come into abutment with the shoulder 204 and prevent the cap 100 from being removed from the container 200. Conversely, when the locking flap 116 is rotated into the unlocked second position, the locking surface 303B will be disposed so that it no longer engages the shoulder 204. In such a disposition, the mobile portion 114 of the locking flange is recessed relative to the interior surface 206, with the locking surface 303B being at least substantially parallel and continuous with the interior surface 206, if not extending outwardly from it.

Moreover, in the case where the cap 100 is not fully pressed down onto the container 200 prior to moving the flap 116 into the locked first position, the motion of the locking surface 303B of the mobile portion 114 of the locking flange will serve to lever the cap 100 into the proper position.

Specifically, the locking surface 303B will bear against an edge 304 of the shoulder 204, such that as the locking flap 116 is rotated into the locked first position, it will exert a force on the container 200 that will cause the cap 100 to be further tightened against the container 200, and then retaining the cap 100 in place once the locking flap 116 is fully disposed in the locked first position. The locking flap 116 will thus multiply the efforts of the user, fixing the cap 100 to the container 200 with a maximum of force and, consequently, a high-integrity seal.

Both the sealing ring 300 and the interior surface 206 of the annular side section 104 are further provided, respectively, with sealing beads 305, 306, which extend over the entire circumference of the sealing ring 300 and the interior surface 206. The sealing beads 305, 306 serve to concentrate the force of the interference fit exerted upon the neck 202, further improving the strength of the seal between the cap 100 and the container 200.

It may be particularly desirable for the neck 202 to comprise a local increase of the thickness of the neck 202 of the container 200 near the mouth 302, as depicted here. This serves as a reinforcement of the mouth 302, offering improved strength to the container 200. Also, the amount of material used to fabricate the container 200 may be reduced, while maintaining a tight seal between the mouth 302 and the sealing beads 305, 306.

It should also be noted that the forms (i.e. cross-sectional profiles) of the sealing beads 305, 306 that are depicted here are merely exemplary. It will be readily understood that, in any particular embodiment, the sealing beads will be configured according to the application in which the cap is to be employed and according to the desired effect they are intended to have.

In this embodiment, the sealing ring 300 is substantially circular in form. However, in other embodiments it may be preferable to provide a sealing ring in a non-circular form, for instance projecting from the disc-shaped top portion 102 along an oval or elliptical curve. Such a form will, in certain applications, help to bring the cap 100 into alignment with the neck 202 of the container when the two are not aligned with each other. In any case, the sealing beads 305, 306 will be substantially circular, in that they will comprise local variations in size to compensate for local deviations in the radius of the sealing ring 300 and achieve correct sealing with the container 200.

Furthermore, in this embodiment the cap is fabricated such that it is of a substantially constant thickness, resulting in a U-shaped profile for the sealing ring 300. This is advantageous in that it facilitates the moulding of the cap 100; however, in other embodiments it may be preferable to provide the sealing ring 300 as a simple projection from the disc-shaped top section of the cap rather than as a folded curve as seen in this embodiment. The exact configuration may be chosen with respect to the application in which the cap is to be employed.

Finally, it should be noted that the container 200 is provided with a support ring 308. The support ring 308 permits the manipulation of the container 200, particularly during a blow-moulding process in which a preform is expanded into the container 200, but also generally during the filling and sealing of the container 200. In this embodiment the support ring 308 is provided separately from the shoulder 204; however, it may be advantageous in other embodiments that the locking flange engages the support ring directly.

Moreover, when the locking flap 116 is disposed in the locked first position, it will extend over the support ring 308 so as to at least partially cover it, giving the container 200 a generally streamlined form and preventing the support ring 308 from being caught on anything when the container 200 is manipulated or transported.

Figure 4A:
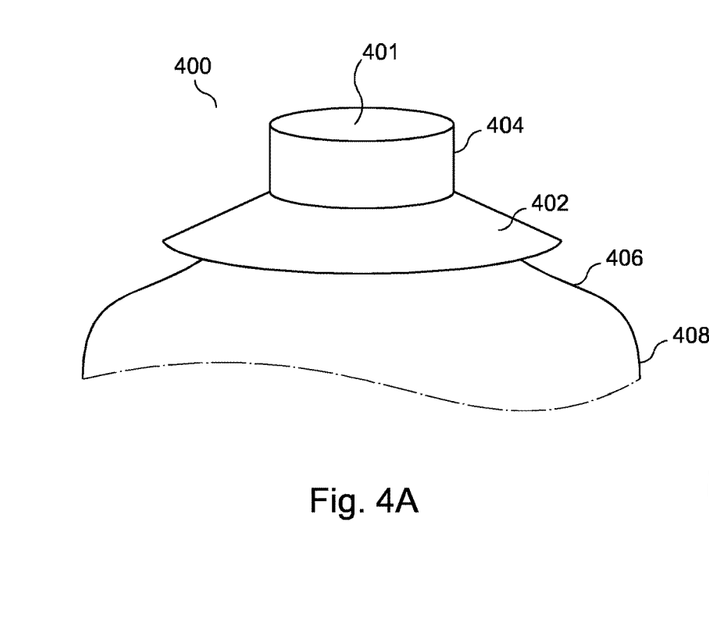
FIGS. 4A & 4B are perspective views of a cap according to a second embodiment of the invention.
Figure 4B:
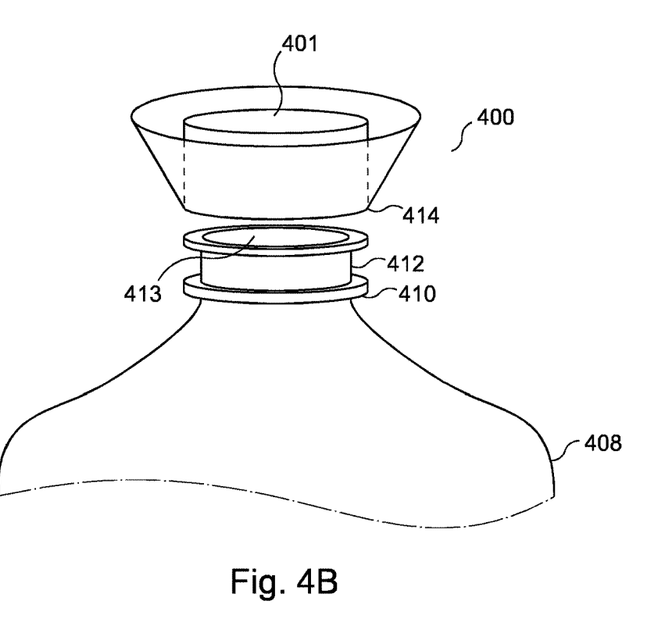

FIGS. 4A & 4B are perspective views of a cap 400 according to a second embodiment of the invention. FIG. 4A depicts the cap 400 wherein a locking flap 402 thereof is disposed in a locked first position, away from a disc-shaped top section 401 and an annular side section 404.

The cap 400 of FIGS. 4A & 4B is similar to that presented in the preceding Figures, except that the locking flap 402 extends about the entire circumference of the annular side section 404 of the cap 400. Moreover, the locking flange (not pictured) extends about the entire circumference of the annular side section 404 as well; the entirety of the locking flange is therefore mobile along with the locking flap 402. When disposed in the locked first position, the locking flap 402 will sit against an upper portion 406 of a container 408; preferably, the locking flap 402 is biased so as to press against the shoulder 406, which will help to avoid the locking flap 402 from catching on objects it may come into contact with, and thereby avoiding any inadvertent movement of the locking flap 402.

In FIG. 4B, the locking flap 402 is disposed in the unlocked second position, disengaging the locking flange (not pictured) from a shoulder 410 of a neck 412 of the container 408 and permitting the cap 400 to be removed from the mouth 413 of the container 408 as shown. As can be seen from FIGS. 4A and 4B the locking flap 402 is in the form of a hollow conic frustum as it extends from the entire circumference of a rim 414 of the annular side section 402.

It will be understood that various changes and modifications to the presently preferred embodiments described herein will be apparent to those skilled in the art. Such changes and modifications can be made without departing from the spirit and scope of the present invention and without diminishing its attendant advantages. It is therefore intended that such changes and modifications be covered by the appended claims.

The invention claimed is:

1. A cap for a container, the cap comprising:
a disc-shaped top section;
an annular side section projecting substantially perpendicularly from the perimeter of the disc-shaped top section;
a locking flange disposed at an extremity of the annular side section opposite the disc-shaped top section;
a locking flap extending from at least a portion of the extremity of the annular side section, the locking flap movable between a locked first position wherein a portion of the locking flange contiguous with the locking flap extends inwardly from an interior face of the annular side section, and an unlocked second position wherein the portion of the locking flange is at least partially recessed relative to the interior face of the annular side section; and
a frangible tab attached perpendicularly to the annular side section and the locking flap, the locking flap immobilized in the locked first position by the frangible tab,
wherein the locking flap has at least one configuration selected from the group consisting of (i) the locking flap is bistably movable between the locked first position and unlocked second position, (ii) the locking flap extends from the extremity of the annular side section along the entire perimeter of the extremity, (iii) the locking flap extends from the extremity of the annular side section along a portion of the perimeter thereof, the locking flange being thereby divided into an immobile first portion and a mobile second portion contiguous with the locking flap, and the immobile first portion of the locking flange extends from a segment of the annular side section comprising between 20° and 80°, inclusive, of the perimeter of the annular side section, (iv) the locking flap extends from the extremity of the annular side section along a portion of the perimeter thereof, the locking flange being thereby divided into an immobile first portion and a mobile second portion contiguous with the locking flap, and the immobile first portion and the mobile second portion of the locking flange are disposed substantially symmetrically about the annular side section, and (v) the locking flap is a segment of a hollow conic frustum.

2. The cap according to claim 1, wherein the locking flap is bistably movable about a center position defined by a plane parallel with the disc-shaped top section and intersecting the extremity of the annular side section, such that it forms an oblique angle with the annular side section when the locking flap is in the locked first position, and forms an acute angle with the annular side section when the locking flap is in the unlocked second position.

3. The cap according to claim 1, wherein the mobile second portion of the locking flange extends from a segment of the annular side section comprising between 20° and 80°, inclusive, of the perimeter of the annular side section.

4. The cap according to claim 1, wherein the immobile first portion is located directly opposite the mobile second portion.

5. The cap according to claim 1, comprising a sealing ring projecting from the disc-shaped top section and disposed coaxially within the annular side section.

6. The cap according to claim 5, wherein the sealing ring projects from the disc-shaped top section following an oval or elliptical curve.

7. A preform for the fabrication of a container, the preform comprising:
a neck opening into a mouth at one extremity and comprising a shoulder located about the neck proximate to the mouth, the shoulder being configured to be engaged by a locking flange of a cap comprising a disc-shaped top section, an annular side section projecting substantially perpendicularly from the perimeter of the disc-shaped top section;
a locking flange disposed at an extremity of the annular side section opposite the disc-shaped top section;
a locking flap extending from at least a portion of the extremity of the annular side section, the locking flap movable between a locked first position wherein a portion of the locking flange contiguous with the locking flap extends inwardly from an interior face of the annular side section, and an unlocked second position wherein the portion of the locking flange is at least partially recessed relative to the interior face of the annular side section; and
a frangible tab attached perpendicularly to the annular side section and the locking flap, the locking flap immobilized in the locked first position by the frangible tab,
wherein the locking flap has at least one configuration selected from the group consisting of (i) the locking flap is bistably movable between the locked first position and unlocked second position, (ii) the locking flap extends from the extremity of the annular side section along the entire perimeter of the extremity, (iii) the locking flap extends from the extremity of the annular side section along a portion of the perimeter thereof, the locking flange being thereby divided into an immobile first portion and a mobile second portion contiguous with the locking flap, and the immobile first portion of the locking flange extends from a segment of the annular side section comprising between 20° and 80°, inclusive, of the perimeter of the annular side section, (iv) the locking flap extends from the extremity of the annular side section along a portion of the perimeter thereof, the locking flange being thereby divided into an immobile first portion and a mobile second portion contiguous with the locking flap, and the immobile first portion and the mobile second portion of the locking flange are disposed substantially symmetrically about the annular side section, and (v) the locking flap is a segment of a hollow conic frustum.

8. A package comprising:
a container comprising a cap comprising a disc-shaped top section;
an annular side section projecting substantially perpendicularly from the perimeter of the disc-shaped top section;
a locking flange disposed at an extremity of the annular side section opposite the disc-shaped top section;
a locking flap extending from at least a portion of the extremity of the annular side section, the locking flap movable between a locked first position wherein a portion of the locking flange contiguous with the locking flap extends inwardly from an interior face of the annular side section, and an unlocked second position wherein the portion of the locking flange is at least partially recessed relative to the interior face of the annular side section, the cap being located upon a mouth of the container such that the locking flange of the cap engages a shoulder of the neck of the container; and a frangible tab attached perpendicularly to the annular side section and the locking flap, the locking flap immobilized in the locked first position by the frangible tab, wherein the locking flap has at least one configuration selected from the group consisting of (i) the locking flap is bistably movable between the locked first position and unlocked second position, (ii) the locking flap extends from the extremity of the annular side section along the entire perimeter of the extremity, (iii) the locking flap extends from the extremity of the annular side section along a portion of the perimeter thereof, the locking flange being thereby divided into an immobile first portion and a mobile second portion contiguous with the locking flap, and the immobile first portion of the locking flange extends from a segment of the annular side section comprising between 20° and 80°, inclusive, of the perimeter of the annular side section, (iv) the locking flap extends from the extremity of the annular side section along a portion of the perimeter thereof, the locking flange being thereby divided into an immobile first portion and a mobile second portion contiguous with the locking flap, and the immobile first portion and the mobile second portion of the locking flange are disposed substantially symmetrically about the annular side section, and (v) the locking flap is a segment of a hollow conic frustum.

* * * * *